July 16, 1968 N. H. EDSTRÖM 3,393,276

THRESHOLD CROSSPOINT IDENTIFYING MEANS FOR AN AUTOMATIC TELEPHONE EXCHANGE

Filed Sept. 22, 1965 2 Sheets-Sheet 1

INVENTOR.
NILS HERBERT EDSTRÖM
BY
Hane and Nydick
ATTORNEYS

INVENTOR
NILS HERBERT EDSTRÖM
BY Hane and Nydick
ATTORNEYS

United States Patent Office 3,393,276

Patented July 16, 1968

3,393,276

THRESHOLD CROSSPOINT IDENTIFYING MEANS FOR AN AUTOMATIC TELEPHONE EXCHANGE

Nils Herbert Edström, Vallingby, Sweden, assignor to Telefonaktiebolaget L M Ericsson, Stockholm, Sweden, a corporation of Sweden Filed Sept. 22, 1965, Ser. No. 489,294
Claims priority, application Sweden, Oct. 14, 1964, 12,339/64
1 Claim. (Cl. 179—18)

The present invention refers to an identifier for identifying a calling subscriber's line in an automatic telephone exchange, in which identifier to each subscriber belongs a crossing point in a coordinate system consisting of wires crossing each other, and in which a change of state of a test wire, belonging to a determined subscriber, activates one wire in a first group and one wire in a second group of wires, the numerical order of which wires indicates the identity of the subscriber.

Such identifiers necessitate a large number of relays and furthermore certain selecting functions are necessary for preventing simultaneously arriving calls from being mixed up. Such an equipment is generlly bulky and the identification time, which is determined by the operating time of the relays, is rather long.

The object of the invention is to provide an identifier that is cheaper and more simple than the identifiers earlier known and that works more rapidly than these.

The identifier according to the invention is substantially characterized in that the test wire of the subscriber is joined in each crossing point to the two conductors belonging to the respective crossing point through a conventional solid state current controlling element of semiconductor type that upon exceeding of a definite threshold voltage can be brought from high resistance condition to low resistance condition and be maintained there as long as the current intensity does not decrease below a minimum value, the identifier comprising a first scanning device, which connects sequentially to each of the wires in the first group of wires a potential that in the idle state potential condition of the subscriber's wire is not sufficient to exceed the threshold voltage of the element connected between this wire and the test wire of the subscriber, while it is sufficient in the calling voltage condition of the subscriber's test wire to bring said connecting element to low resistance condition, and a second scanning device, which connects sequentially to each of the wires of the second group a voltage as soon as said solid state element has been brought to low resistance condition, which voltage has such a value and polarity that together with the voltage connected to the already low-resistant solid state element through the conductor, belonging to the first group, it brings the other solid state element, connected to the crossing point, to low resistance condition, so that the current passing through the conductors, belonging to the crossing point, stops the scanning and allows a determination of the numerical order of the two crossing wires in the respective groups of wires.

Figure 1:
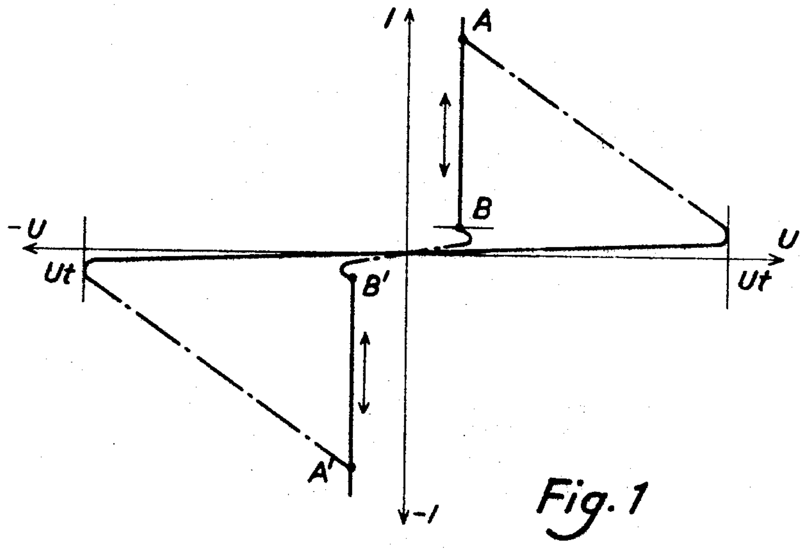
Figure 2:
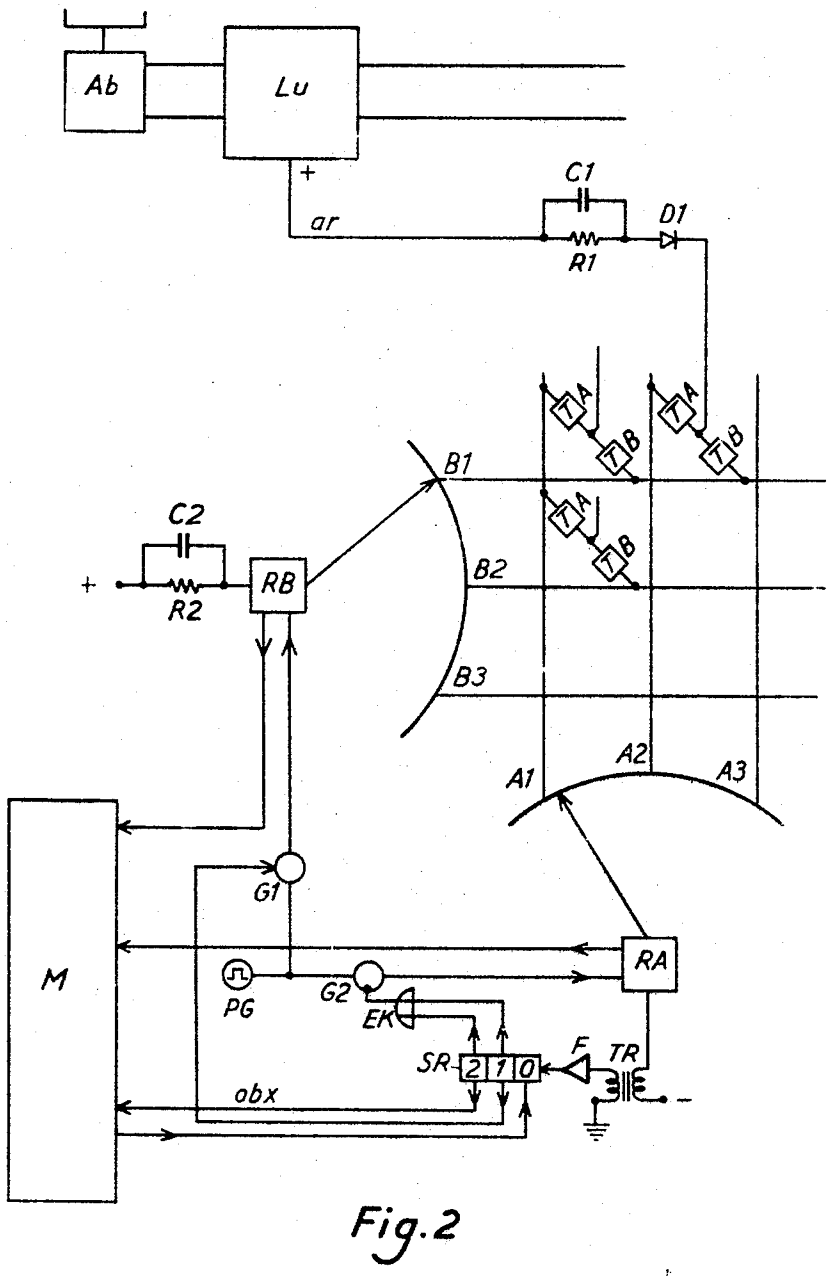

The invention will be described herebelow by means of an embodiment with reference to the attached drawing, in which FIG. 1 shows a voltage current characteristic of a solid state current controlling element used in the identifier according to the invention, and FIG. 2 shows diagrammatically an identifier according to the invention.

The solid state current controlling elements, which are of the semi-conductor type, are normally in a high resistance state which may be explained by the fact that the semi-conducting material is in an amorphous state. If a current passes through the semi-conducting amorphous layer with sufficient current density, the layer becomes conducting. The change from insulating to conducting condition occurs, when an activating voltage of for example 60–70 v. is exceeded, which voltage value is dependent on the chemical composition of the semiconducing material. FIG. 1 shows a voltage-current characteristic of such an element, in which the conducting condition exists, after that the element has been exposed to the threshold voltage, until the current decreases below a certain lower limit. Provided the current value has decreased below this limit, the low resistance state ceases, and the element is again transformed into high resistance state. This element is herebelow called a "threshold element."

FIG. 2 shows diagrammatically an identifier according to the invention with only those parts indicated which are essential from the point of view of the invention. By A*b* is indicated a subscriber's telephone instrument, which through its line equipment LU can be connected to the other switching means of the exchange. The line equipment, which may be of arbitrary type, is indicated only diagrammatically because its only purpose, from the point of view of the invention, is to change the potential of a calling wire upon the occurrence of a call. According to the example the calling wire, normally having no potential, is provided with positive potential, when the subscriber originates a call. The identification means comprises two groups of conductors A1, A2, A3 and so on, and B1, B2 and B3 and so on, which cross each other. Said two groups of conductors can be cyclically scanned, each by means of its own scanning device RA and RB respectively. These scanning devices consist for example of conventional counting chains, which are stepped forward by means of pulses obtained from a pulse generator PG. To each of the crossing points of the two groups of conductors belongs a subscriber's line equipment LU, the calling wire of which is through a threshold element, TA and TB respectively, of the above defined type connected to the A- and the B-conductor respectively belonging to the crossing point. These threshold elements are normally in a high resistance state, so that they do not close the circuit between these two conductors, of which, for example, the A-conductor may be connected to negative potential while the B-conductor may be connected to positive potential. According to the example the A-group is scanned cyclically, while the scanning of the B-group stands still at an arbitrary B-wire, and the scanning of the B-group is started when the scanning of the A-group stops, as will be explained below more closely.

Supposing the subscriber belonging to the crossing point of the conductors A2 and B1 lifts his handset, his calling wire will be provided with calling potential, which implies that, when the scanning device RA has reached the conductor A2, the voltage through the threshold element TA will be sufficient to bring said element to low resistance condition. The result is that a current passes from the positive potential of the calling wire *ar* through the rectifier D1, the threshold element TA, the conductor A2, the scanning device RA, and the primary winding of a transformer TR, to the negative potential. A pulse is induced in the secondary winding of the transformer TR, which pulse through an amplifier F is conducted to a counting chain SR. The counting chain SR has three stages indicated by 0, 1 and 2. Normally the counting chain is in the 0-position in which position it does not produce any signal. When the counter receives a pulse from the transformer TR, the counting chain is stepped forward to the stage 1, which implies that an inhibiting signal is sent through an OR circuit EK to a gate G2, which inhibits the pulses fed from the pulse generator PG to the scanning device RA, and furthermore sends a signal to another gate G1 that until now has blocked the pulses from the pulse generator PG to the scanning device RB, which now is opened. In consequence of this, the scanning of the A-group stops and the scanning device RB starts the scanning of the conductor group B, until it arrives to the B-conductor belonging to the crossing point of the calling subscriber, in this case the wire B1. In view of the fact that through the threshold element TB now a full voltage is applied between the connecting point of the calling wire *ar* and the conductor B1, the threshold element is transformed into its low resistance state, so that a current passes through the conductor B1, the threshold element TB, the threshold element TA, the conductor A1, and the primary winding of the transformer TR to the negative pole. A pulse is obtained in the secondary winding of the transformer, which pulse steps forward the counting chain SR to the stage 2. In this position the counter SR partly sends an inhibiting pulse to the gate G2, so that the scanning device RA is still standing and partly a signal to the marker to indicate that the reading of the address of the calling subscriber has to be carried out. Said address is indicated by the position of the scanning devices RA and RB that give an A- and a B-coordinate. Now the marker can set up a call in the conventional manner. Upon the setting up of the connection the positive marking on the line equipment LU ceases, implying that the positive potential in the junction point of the threshold elements TA and TB ceases. Simultaneously with the setting up of the connection the marker restores the counting chain SR to 0-position. In consequence the scanning device RA is started, which implies, that the negative potential is disconnected from the wire A2, and the threshold elements TA, TB return to their high resistance state. The scanning now continues until the scanning device has reached an A-wire that through a threshold element is connected to a calling subscriber, after which the process described hereabove is repeated.

As an example may be mentioned, that the positive and the negative potentials, applied through the scanning devices RA, RB to the conductor groups A and B, are 60 v. while for the current supply otherwise a voltage of about 24–48 v. is used. The purpose of the capacitances C1 and C2 respectively is to allow in the moment of connection the passing of a sufficiently strong current to ignite the threshold elements.

I claim:

1. An identifier for identifying a calling subscriber's line in an automatic telephone exchange, said identifier comprising a coordinate system formed by a first group of conductors and a second group of conductors crossing each other, each subscriber's line being assigned to an individual crossing point of said coordinate system and having a test wire joined through a first connection means to one conductor of said crossing point and through a second connection means to the other conductor of said crossing point, said test wire having alternatively an idle state potential or a calling state potential, each said first and said second connection means comprising a bidirectional semi-conductor current controlling device including a solid state semi-conductor material and electrodes coupling the same between the respective conductor and said test wire, said solid state semi-conductor material in one state having at least portions thereof between the electrodes in one structural state which is of high resistance and substantially an insulator for blocking the flow of current therethrough in either or both directions, when an applied voltage is below an upper threshold voltage level, and in another state having at least portions thereof between the electrodes in another structural state which is of low resistance and substantially a conductor for conducting the flow of current therethrough in either or both directions, when the applied voltage is raised above the upper threshold voltage level and then remains above a lower threshold voltage level, said at least portions of said solid state semi-conductor material being controlled and substantially instantaneously changed from said one blocking structural state to said other conducting structural state by the imposition of a transient voltage of any polarity above said upper threshold voltage level and reverted to said blocking structural state when the current therethrough reduces substantially to zero, a first scanning device including means for supplying to each of the conductors in said first group of conductors in turn a potential, which added to the idle state potential of the test wire is lower than the threshold voltage of said first semi-conductor current controlling device, but added to said calling state potential on the test wire is higher than said upper threshold value so as to transform said element into low resistance state, means for supplying a voltage above said lower threshold level to said first semi-conductor current controlling device when in low resistance state and for supplying signals to said first scanning device to stop the scanning of the first group of wires, and a second scanning device including means for supplying to each of the conductors of said second group of conductors in turn a potential, when said first scanning device is at a standstill, said potential having a level which added to the voltage maintaining said first current controlling element in low resistance state is higher than said upper threshold value so as to transform the second semi-conductor current controlling device into low resistance state, means for supplying current through said second element, when in low resistance condition, to stop the scanning of said second scanning device, to make possible the determination of the numerical order of the two conductors belonging to the respective subscriber's test wire.

References Cited

UNITED STATES PATENTS

| | | | |
|---|---|---|---|
| 2,892,037 | 6/1959 | Feiner | 179—18.61 |
| 3,271,591 | 9/1966 | Ovshinsky | 307—88.5 |
| 3,278,687 | 10/1966 | Everett | 179—18.61 |

KATHLEEN H. CLAFFY, *Primary Examiner.*

LAWRENCE A. WRIGHT, *Examiner.*